US007000783B2

(12) United States Patent     (10) Patent No.: US 7,000,783 B2
Webb     (45) Date of Patent: Feb. 21, 2006

(54) UTILITY HOOK FOR ATTACHMENT TO AN OVERHEAD GARAGE DOOR TRACK

(76) Inventor: Martin D. Webb, 3213 Itasca, McKinney, TX (US) 75070

( * ) Notice: Subject to any disclaimer, the term of this patent is extended or adjusted under 35 U.S.C. 154(b) by 118 days.

(21) Appl. No.: 10/704,230

(22) Filed: Nov. 7, 2003

(65) Prior Publication Data

US 2005/0098511 A1    May 12, 2005

(51) Int. Cl.
    *A47F 7/00*     (2006.01)
(52) U.S. Cl. ........................... 211/20; 211/113; 248/340
(58) Field of Classification Search ............ 211/119.1, 211/20, 119.16, 113; 248/340, 215, 317, 248/339; 105/150; 452/187
See application file for complete search history.

(56) References Cited

U.S. PATENT DOCUMENTS

| | | | | |
|---|---|---|---|---|
| 217,747 | A * | 7/1879 | Robertson | 452/187 |
| 1,388,799 | A * | 8/1921 | Christensen | 172/674 |
| 1,960,607 | A * | 5/1934 | Wallace | 248/301 |
| 2,750,143 | A * | 6/1956 | Sjoboen | 248/317 |
| 2,938,696 | A * | 5/1960 | Hinshaw | 248/215 |
| 2,950,823 | A * | 8/1960 | Woidka | 211/119.1 |
| 3,653,624 | A * | 4/1972 | Abel | 248/312 |
| 3,738,477 | A * | 6/1973 | Gename | 452/187 |
| 3,765,058 | A * | 10/1973 | Scdoris | 24/369 |
| 3,782,559 | A * | 1/1974 | Wright | 211/17 |
| 3,828,936 | A | 8/1974 | Hoenig | 211/19 |
| 3,891,176 | A * | 6/1975 | Downing et al. | 248/340 |
| 3,978,988 | A * | 9/1976 | Friedeberg | 211/113 |
| 4,431,154 | A * | 2/1984 | Hamm | 248/215 |
| 4,759,091 | A * | 7/1988 | Kiss | 15/105 |
| 4,887,785 | A * | 12/1989 | Blaich | 248/339 |
| D308,099 | S * | 5/1990 | Jimenez | D24/128 |
| 4,971,279 | A * | 11/1990 | George | 248/214 |
| 5,074,419 | A | 12/1991 | Smith | 211/17 |
| 5,078,276 | A | 1/1992 | Rogge et al. | 211/18 |
| 5,118,059 | A * | 6/1992 | Mainer | 248/215 |
| 5,312,079 | A * | 5/1994 | Little, Jr. | 248/230.6 |
| 5,478,039 | A * | 12/1995 | Wright | 248/341 |
| D378,343 | S * | 3/1997 | Macor | D8/73 |
| 5,816,016 | A * | 10/1998 | Zarnick | 52/747.1 |
| 6,086,030 | A * | 7/2000 | Hepworth | 248/215 |
| 6,224,030 | B1 * | 5/2001 | Hepworth | 248/215 |
| D457,410 | S * | 5/2002 | Von Fange | D8/73 |
| 6,439,405 | B1 | 8/2002 | Haneken | 211/113 |
| 6,575,416 | B1 | 6/2003 | Avinger | 248/307 |
| 2003/0213763 | A1 * | 11/2003 | Morin et al. | 211/119.1 |
| 2005/0145769 | A1 * | 7/2005 | Ives et al. | 248/447.1 |

* cited by examiner

*Primary Examiner*—Richard Chilcot
*Assistant Examiner*—James C. Dooley
(74) *Attorney, Agent, or Firm*—Michael L. Diaz

(57) ABSTRACT

A utility hook is adapted to removably fit upon a standard overhead garage door track so as to not interfere with the garage door operation and may be used to suspend bulky items from the garage door track. The utility hook's lower portion may be hook-shaped to suspend a bicycle or alternatively have a flat horizontal bottom to suspend a ladder. The utility hook's upper portion is a vertical segment continuous from the lower portion and bent at the top to approximately a right angle with an inward turned lip on the end, fitting over and engaging the upper flange of the track when the utility hook is set in place. The hook may be moved along the track by first rotating the utility hook outward away from the track and then sliding the utility hook along the track.

20 Claims, 4 Drawing Sheets

UTILITY HOOK FOR ATTACHMENT TO AN OVERHEAD GARAGE DOOR TRACK

BACKGROUND OF THE INVENTION

1. Technical Field of the Invention

The present invention relates to utility hooks, and more particularly, to a removable storage hook adapted to fit securely to an overhead garage door track so as to not interfere with the garage door operation.

2. Description of Related Art

Conventional storage fixtures and particularly garage storage devices have long been used to store items on the walls or ceiling of a garage. The storage space is often at a premium. Many garages have been equipped with extensive shelving to store items off the garage floor, but large bulky items have presented additional problems. Storing a bicycle or ladder on a wall often covers a large percentage of the available wall area. Large items, such as bicycles and ladders, have often been left on the garage floor. Additionally, specialized fixtures are used to hold the bulky items on the garage ceiling or wall. Installation of the specialized devices has required some skill and are most often attached inconveniently or in a complex manner to the ceiling or wall by nails, bolts, or screws. Consequently, many storage devices have been developed to more effectively and efficiently use available storage space. Oftentimes, these devices position bulky items in hard to reach places, making it awkward to position or remove the stored items on the storage devices.

Although there are no known prior art teachings of a device such as that disclosed herein, prior art references that discuss subject matter that bears some relation to matters discussed herein are U.S. Pat. No. 5,078,276 to Rogge et al. (Rogge), U.S. Pat. No. 3,782,559 to Wright (Wright), U.S. Pat. No. 6,439,405 to Henneken (Henneken), U.S. Pat. No. 6,224,030 Hepworth (Hepworth), U.S. Pat. No. 6,575,416 to Avinger (Avinger), and U.S. Pat. No. 3,978,988 to Friedeberg (Friedeberg). These patents discuss storage devices.

Rogge discloses a bicycle storage device that includes a bracket assembly that may be bolted or screwed to a ceiling or wall. The bracket has an arm that rotates between an operational position to a support a bicycle or rotates to a storage position. Rogge discloses a device which must be inconveniently anchored to a wall or a ceiling most often by bolts or screws. When the Rogge bicycle rack is mounted to a garage wall, a large portion of the available wall area is used exclusively for bicycle storage. In addition when the Rogge fixture is mounted to the ceiling, the bicycle support arms are at an inconvenient height. Rogge does not teach nor suggest a storage device which is easily attachable to a garage door track.

A more accessible height for a bicycle storage device is disclosed by Wright. The Wright ceiling cycle rack includes a plate removably extending from the ceiling. The plate is anchored to the ceiling by a plurality of hooks or the like. A pair of J-shaped hangers that engage a bicycle frame are also attached to the plate. The J-shaped hangers are laterally adjustable to hang various models of bicycles at selectable heights. The Wright fixture preserves valuable wall space, but suffers from the disadvantage of requiring properly spaced anchors in the ceiling. Wright does not teach nor suggest a utility hook which is attachable to a garage door track.

Henneken discloses a storage device fully suspended from the ceiling that holds different shapes/types of elongated objects. Henneken discloses the use of at least two brackets anchored to the ceiling and spaced appropriately to hold the desired items. The brackets may include different pockets of storage space that may be used for holding/storing elongated items of different shapes or cross-sectional configurations. The Henneken device is inconveniently anchored close to the ceiling and is immobile. Henneken does not teach nor suggest a device which is easily attachable to a garage door track.

Hepworth discloses a hook/hanger for use at the top of a door. The Hepworth device has a hook extending downward at the front with an upper portion bent at a right angle. The right angle has barbs intended to be driven into the top of the door. The Hepworth apparatus preserves wall space, but is permanently mounted to the door and is ill-suited for hanging large items. Hepworth does not teach nor suggest a utility hook which is attachable to a garage door track.

Avinger merely disclosed an improved version of an over-the-door hook. Avinger teaches a mechanism to adjust the height of the desired hanging item and a mechanism to hang the hook over the top of the door so that the hook is not permanently attached to the door. Similar to the Hepworth device, the Avinger apparatus preserves wall space, but is also ill-suited for hanging large items. Avinger does not teach nor suggest a storage device which is easily attachable to a garage door track.

Friedeberg discloses a pair of braced clothesline holders that are suspended temporarily or permanently from the tracks of any standard overhead door by flat hooks that fit snugly down over the tracks so as not to interfere with the operation of the garage door. Friedeberg requires that the flat hooks open downwardly and have a long leg and a short leg. The long straight leg is secured to a beam and the short leg is adapted to hook over the garage door track. Two flat hooks are required on each of two opposing beams and a brace holds the flat hooks in engagement with the garage door track. A clothesline is strung between the opposing beams. Friedeberg does not teach nor suggest additional uses of the space around the garage door track, such as storing bulky items. Friedeberg does not teach nor suggest using a simple unbraced fixture over the garage door track that uses a lip hooking over the flange on the top of the garage door track to position the fixture against the track. Friedeberg merely discloses a clothesline which attaches to parallel tracks of a garage door.

Accordingly, it has been found that a need exists for a simple, cost effective, and efficient way of storing large or bulky items in a garage. A device and method are needed to store items such as ladders, bicycles, and fishing poles off the garage floor and yet preserves wall space for the storage of other items. A device is needed that requires minimal skills for installation and is easily adjustable. It is an object of the present invention to provide such an apparatus.

SUMMARY OF THE INVENTION

In one aspect, the present invention is a garage storage system that uses a removable garage door utility hook adapted to attach to a standard overhead garage door track and support an object in an elevated position from the garage door track. The garage door utility hook includes a lower object supporting portion and an upper garage door track attaching portion. The lower portion is formed to engage and may singularly or plurally support the object. The upper portion, which is continuous from the lower portion, is formed to engage over and attach to a standard overhead garage door track so as not to interfere with the garage door operation. The garage door hook is rigidly formed from metallic compounds, such as heavy gauge steel stock, but optionally may be formed from plastic or composite compounds. Optionally the garage door utility hook may be enclosed with a soft protective cover.

In second aspect, the present invention is a garage storage system that uses a removable garage door utility hook adapted to attach to a standard overhead garage door track and support an object in an elevated position, such as stored bicycles or stored elongated items like pipes and fishing poles, from the garage door track. The garage door utility hook includes a lower object supporting portion and an upper garage door track attaching portion. The lower portion is formed in a hook-shaped end to engage and support the bulky items. The upper portion continues vertically from the lower portion. The upper portion is formed with approximately a right angle bend that may extend over the ceiling mounted section of the garage door track, such that the upper portion of the utility hook may fit tightly against the outer vertical surface and outer horizontal upper flange of the ceiling mounted section of the garage door track. The right angle extension further comprises a lip formed in such a manner as to nonpermanently engage and hold the garage door utility hook onto the ceiling mounted section of the garage door track as not to interfere with the garage door operation. The lip may have approximately a 180 degree bend towards the lower portion of the garage door utility hook, such that the lip may tightly encompass the horizontal upper flange's edge. Optionally, the juncture of the upper and lower portions may be twisted. The twist orients the hook-shape end approximately ninety degrees to the plane of the upper portion such that the supported item is in a plane perpendicular to the ceiling mounted section of the garage door track.

In a third aspect, the present invention is a garage storage system that uses a removable garage door utility hook adapted to attach to an installed standard overhead garage door track and support a bulky flat item in an elevated position, such as a stored ladder, from the garage door track. The garage door utility hook includes an upper garage door track attaching portion and a lower object supporting portion. The upper portion is formed with approximately a right angle bend that may extend over the ceiling mounted section of the garage door track, such that the upper portion of the utility hook may fit tightly against the outer vertical surface and outer horizontal upper flange of the ceiling mounted section of the garage door track. The right angle extension further comprises a lip formed in such a manner as to nonpermanently engage and hold the garage door utility hook onto the ceiling mounted section of the garage door track as not to interfere with the garage door operation. The lip may have an approximately 180 degree bend towards the lower portion of the garage door utility hook, such that the lip may tightly encompass the horizontal upper flange's edge. The utility hook's lower portion, extending downward and orientated in the same plane as the upper portion, has a first bend segment oriented away from the lip of the upper portion. The lower portion's first bend segment further extends downward to a second bend segment. The second bend segment is orientated back towards the lip of the upper portion. Furthermore, the lower portion's second bend segment horizontally extends under the utility hook's upper portion, with the lower portion's second horizontal segment oriented approximately parallel to and under the upper portion's right angle extension to provide a flat supporting surface.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
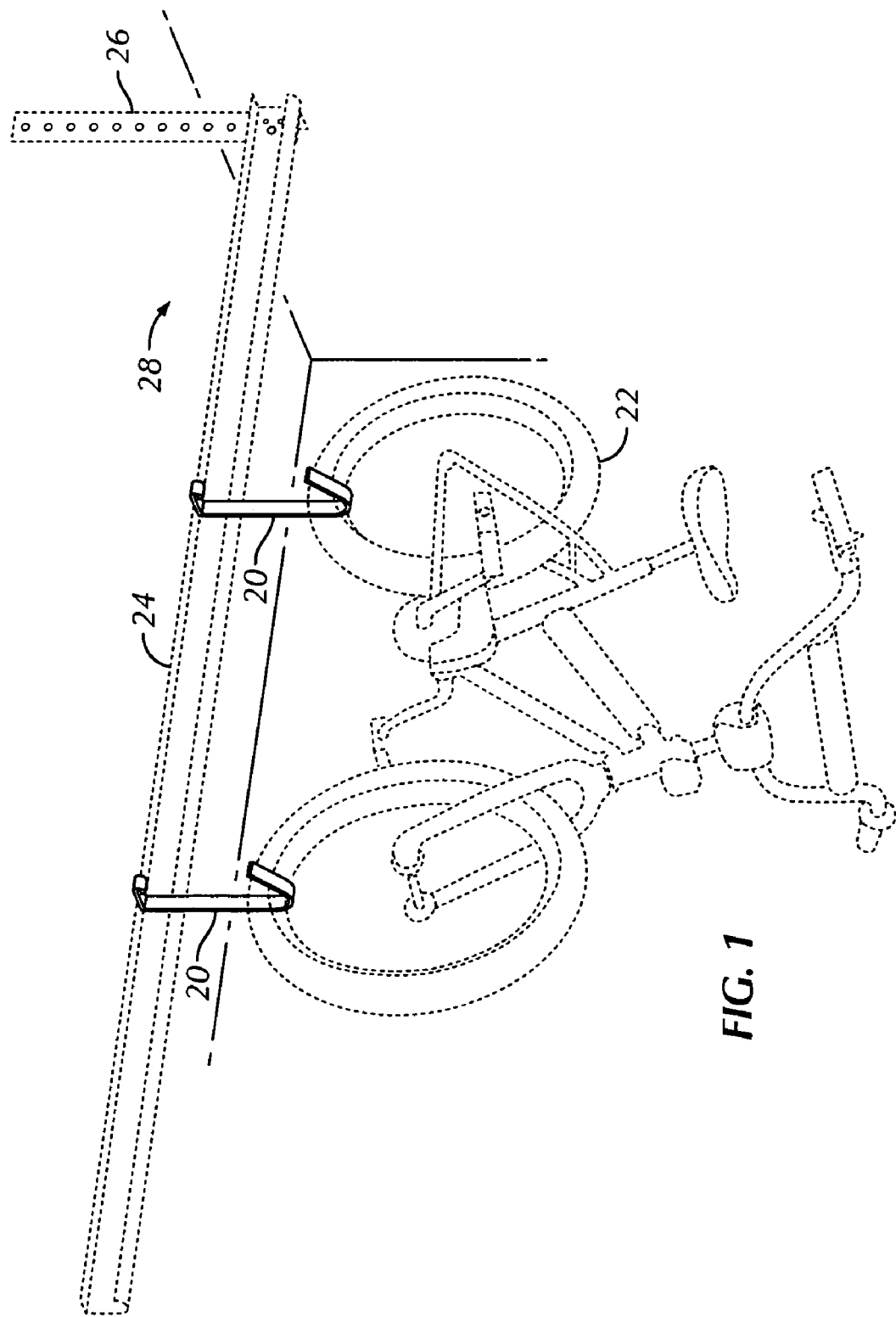
FIG. 1 is a front view of a garage door utility hook mounted on a standard overhead garage door track in the preferred embodiment of the present invention.

A moveable garage door utility hook for supporting an object in an elevated position from a standard overhead garage door track is disclosed. FIG. 1 is a front view of the preferred embodiment of the garage door utility hook 20 mounted on a standard overhead garage door track 24 (shown in phantom) intended to store bulky items, such as a bicycle 22 (shown in phantom), under and parallel to the garage door track. The garage door track is mounted via standard bracing 26 (shown in phantom) to the garage ceiling 28.

Figure 2:
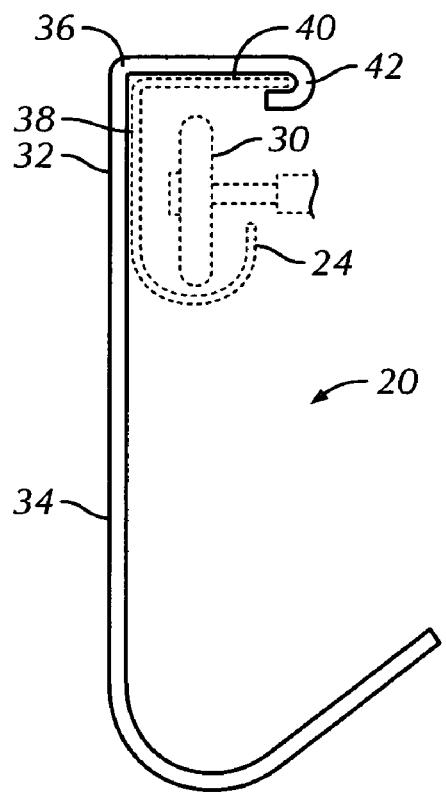
FIG. 2 is side view of the preferred embodiment of the garage door utility hook of FIG. 1.

FIG. 2 is side view of the preferred embodiment of the garage door utility hook 20. The utility hook is shown installed on a standard overhead garage door track 24 (shown in phantom cross section). A standard garage door roller wheel 30 (shown in phantom) is shown within the garage door track. The utility hook has a lower portion 34 that is hook-shaped to engage and may singularly or plurally support the bulky item. The utility hook also has an upper portion 32 vertically continuous from the lower portion, wherein the upper portion is formed with approximately a right angle bend 36 that may extend over the ceiling mounted section of the garage door track. The upper portion of the utility hook may fit tightly against the outer vertical surface 38 (shown in phantom ) and outer horizontal upper flange 40 (shown in phantom) of the ceiling mounted section of the garage door track 24 (shown in phantom). The right angle horizontal extension 36 of the utility hook further comprises a lip 42 formed in such a manner as to nonpermanently engage and hold the garage door utility hook onto the ceiling mounted section of the garage door track as not to interfere with the garage door operation. Optionally, the garage door utility hook may be permanently mounted to the garage door track by using a metal screw or bolts through the utility hook into the vertical side of the garage door track.

The garage door utility hook 20 may be rigidly constructed of a metallic material, plastic or a composite material. Preferably, the utility hook is constructed of flat heavy gauge steel bar, such as 11 gauge by 0.500 inches in width. The overall height of the utility hook from the top of the upper portion 32 to the bottom of the lower portion 34 may be constructed for the actual garage site, i.e., a taller than average garage door may require a correspondingly longer utility hook for accessability. Height adjustment problems may also be addressed by using an extendable lower portion that slides downward on an opposing track from the upper section. Such hook height adjustments are well known in the art. A preferred height is approximately 7.00 inches. The dimensions of the hook-shaped lower portion may be varied, but a hook bend of approximately 140 degrees with a 0.75 inch radius orientated under the upper section is preferred to help maintain a center of gravity below the upper portion. The dimensions of the upper section should be closely matched to the shape of the garage door track. Preferably, the right angle extension 36 has an overall length of approximately 1.36 inches. Preferably the lip 42 dimensions are an overall height of approximately 0.34 inches with a 180 degree inward bend and a lip length of approximately 0.35 inches. The surface of the utility hook may be finished in numerous ways, such as unfinished, galvanized, spray painted, powder coated, or the hook-shape may be covered with a protective soft casing.

In the preferred manner of using this invention (reference FIGS. 1 and 2), a user places the utility hook 20 over a standard garage door track 24 (shown in phantom) by tipping the utility hook's lip 42 downward and over the garage door track's upper flange 40 (shown in phantom). The utility hook is next pulled downward to place the upper portion of the utility hook in close proximity to the garage door track. The user may then store selected items on the utility hook on its lower portion, which includes a curved, opened end. The objects supported by the utility hook are supported by the hook directly below the garage door track. The utility hook may be removed or slid along the garage door track by reversing the fore-mentioned process. The hook may be used singularly or in combination to store selected items. FIG. 1 shows the use of two utility hooks to store a single bicycle. However, the same bicycle may be store from a single utility hook. The ability to slide the hook along the garage door track allows the user to optimize the storage placement, i.e., heavy items closer to bracing supports 26 or bicycles stored away from an area where a vehicle's door may be opened.

Figure 3:
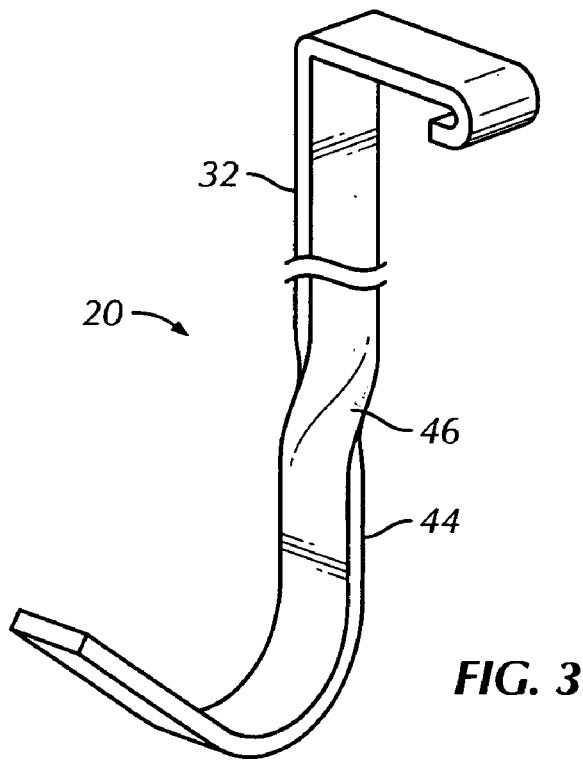
FIG. 3 is a side view of a first alternative embodiment of the garage door utility hook.

FIG. 3 is a partial side view of a first alternative embodiment of the garage door utility hook 20, intended to store bulky items perpendicular to the garage door track 24 (reference FIG. 1). The alternative embodiment has an upper portion 32 continuous from a lower portion 44. The upper portion is of dimensions, construction, and function similar to the preferred embodiment. The lower portion may be constructed in a hook-shaped end similar to the preferred embodiment, but the lower portion's juncture to the upper portion has approximately a ninety degree twist 46. The twist may be in a clockwise or a counter clockwise direction.

Figure 4:
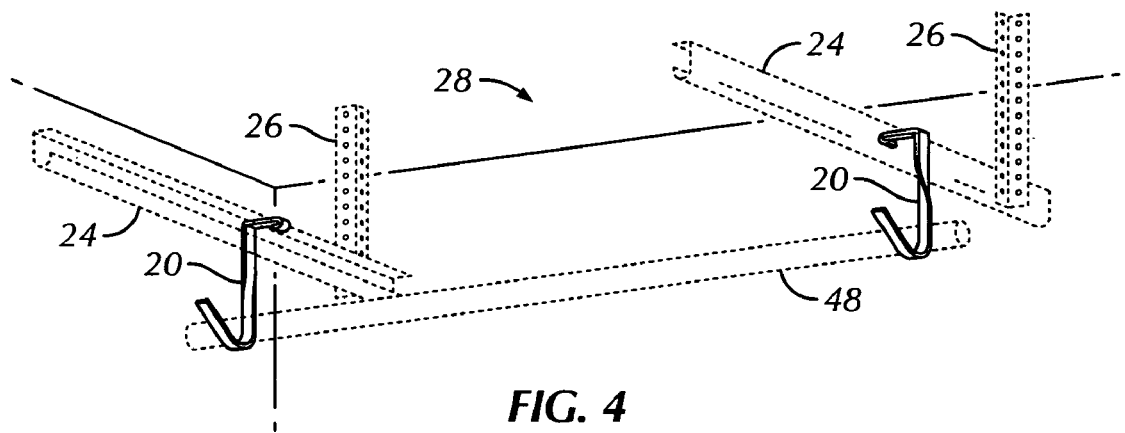
FIG. 4 is a front view of the garage door utility hook of FIG.3.

FIG. 4 is a front view of a first alternative embodiment of the garage door utility hook 20 shown mounted on opposing garage door tracks 24 (shown in phantom) storing an elongated bulky item, i.e., a pipe 48 (shown in phantom), perpendicular to the garage door tracks. Other elongated items, such as a fishing pole may similarly be stored. The manner of using the first alternative embodiment is as disclosed above.

Figure 5:
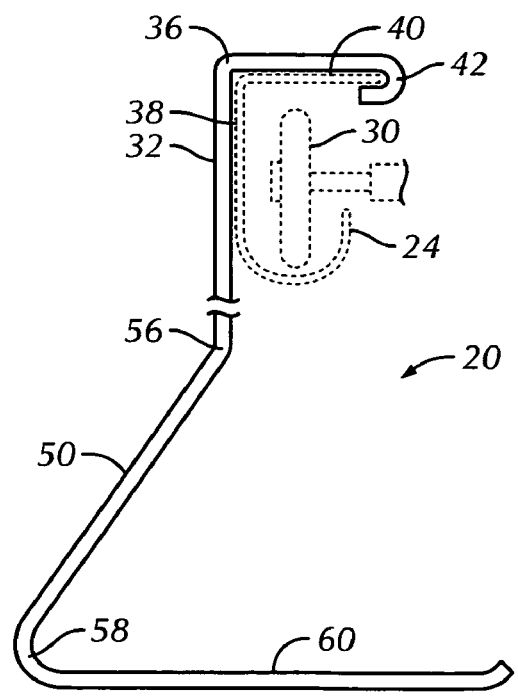
FIG. 5 is a side view the garage door utility hook in a second alternative embodiment of the present invention.

FIG. 5 is a side view of second alternative embodiment of the garage door utility hook 20 intended to engage and store an elongated flat item under and parallel to the garage door track 24 (shown in phantom). The second alternative embodiment has an upper portion 32 continuous from a lower portion 50. The upper portion is of dimensions, construction, and function similar to the preferred embodiment. The lower portion, extending downward from and orientated in the same plane as the upper portion, has a first bend 56 orientated away from the lip of the upper portion. The lower portion then extends downward to a second bend 58 orientated back toward the lip of the upper portion. The lower portion then has an extension 60 under the upper portion. Preferably, the first bend is approximately 45 degrees and the second bend is approximately 135 degrees. The combination of the lower portion's bends result in a flat horizontal extension that is approximately parallel to and under the upper portion's right angle extension 36. The flat horizontal extension of the lower portion should be under the upper portion to locate the center of gravity of the stored items under the upper portion. Optionally, the flat horizontal extension of the lower portion may have a catch or slight upturn at the end to prevent a stored item from sliding off the utility hook. Additionally, the lower portion's bends may be in a reverse orientation, provided the stored item's center of gravity remains under the upper portion.

Figure 6:
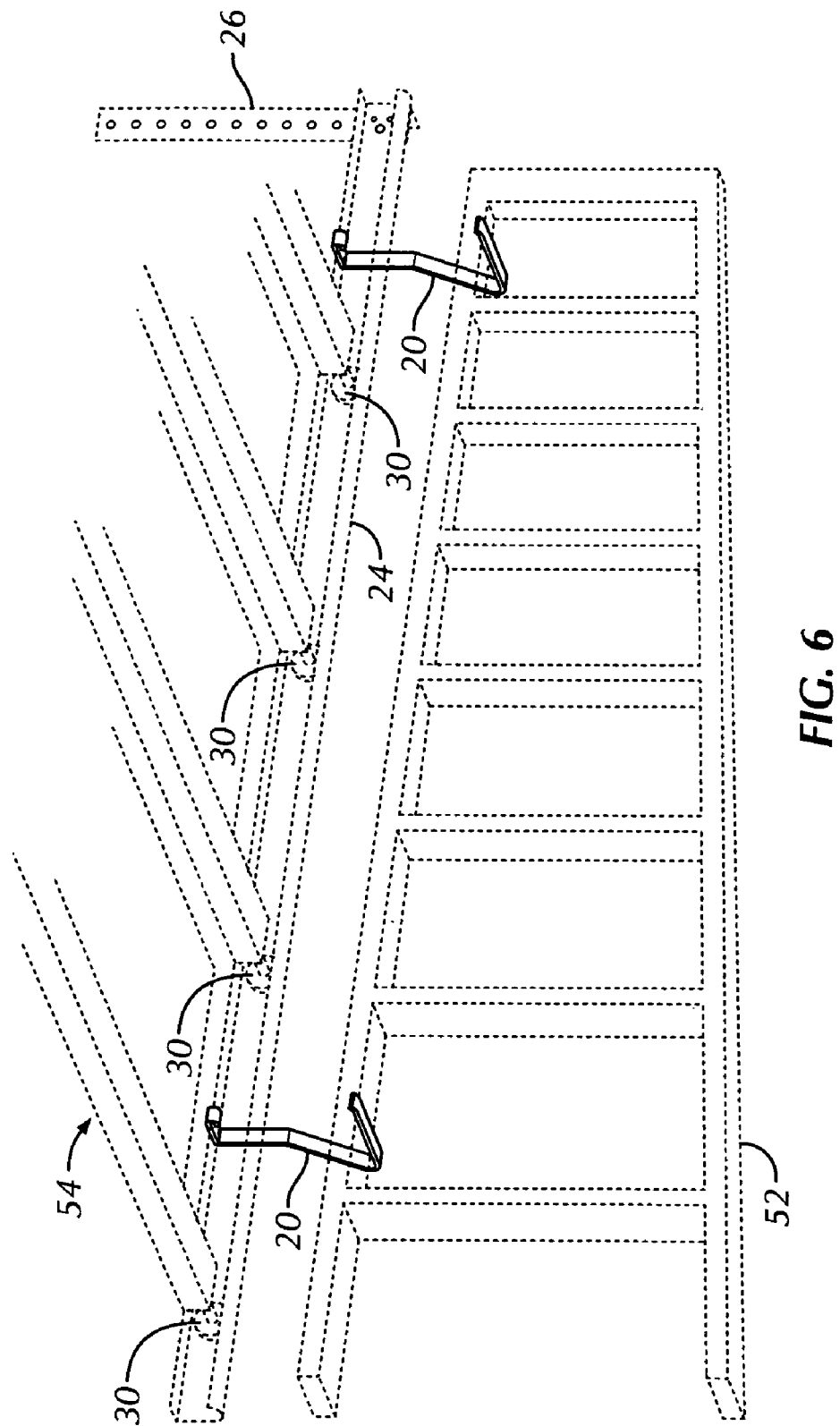
FIG. 6 is a front view the garage door utility hook of FIG. 5.

FIG. 6 is a front view of a second alternative embodiment of two garage door utility hooks 20 storing a ladder 52 (shown in phantom) under and parallel to the garage door track 24 (shown in phantom). A standard panel garage door 54 (shown in phantom) is shown in the raised position for reference. The door is mounted within the garage door track by the door roller wheels 30. The manner of using the second alternative embodiment is as disclosed above.

It is thus believed that the operation and construction of the present invention will be apparent from the foregoing description. While the apparatus shown and described has been characterized as being preferred, it will be readily apparent that various changes and modifications could be made therein without departing from the scope of the invention as defined in the following claims.

What is claimed is:

1. A system for storing an object in an elevated position from a standard overhead garage door track comprising:
an installed standard overhead garage door track;
a utility hook having an upper portion wherein said upper portion will engage and attach to said standard overhead garage door track so as not to interfere with the garage door operation; and
a utility hook having a lower portion with a curved opened end, continuous from said upper portion, with a shape that is configured to support an object, the utility hook supporting the object directly underneath the track.

2. The garage storage system of claim 1, wherein said upper portion is removably attached to the ceiling mounted section of the overhead garage door track and may singularly or plurally support said object.

3. The garage storage system of claim 2, wherein said utility hook is structurally formed of a rigid metallic material.

4. The garage storage system of claim 3, wherein the metallic material is heavy gauge flat steel bar.

5. The garage storage system of claim 4, wherein said lower portion is covered by a soft protective casing.

6. The garage storage system of claim 2, wherein said utility hook is structurally formed of a rigid composite material.

7. The garage storage system hook of claim 2, wherein said utility hook is structurally formed of rigid plastic.

8. The garage storage system of claim 2, wherein said lower portion is hook-shaped.

9. The garage storage system of claim 8, wherein said hook-shape is orientated in the same plane as said upper portion and the hook-shape opens toward the center of the garage door upon installation of the utility hook on the garage door track.

10. The garage storage system of claim 2, wherein:
said utility hook has a twist at the juncture of the lower and upper portions; and
said twist orientates the hook-shape approximately ninety degrees to the plane of the upper portion such that the object stored on an installed utility hook, is orientated in a plane perpendicular to the ceiling mounted section of the garage door track.

11. The garage storage system of claim 2, wherein:
said utility hook has a lower portion extending downward and orientated in the same plane as said upper portion, the lower portion having a first bend segment orientated away from the lip of the upper portion;
said lower portion's first bend segment extending downward to a second bend segment orientated back toward the lip of the upper portion; and
said lower portion's second bend segment horizontally extending under the upper portion with the lower portion's second horizontal segment orientated approximately parallel to and under the upper portion's right angle extension to provide a flat supporting surface.

12. The garage storage system 11, wherein the end of said lower portion's segment has an upturned tip.

13. The garage storage system of claim 2, wherein:
said upper portion is continuously attached vertically to the lower portion of the utility hook and said upper portion is formed with approximately a right angle bend that may extend over the ceiling mounted section of the garage door track, such that the upper portion of the utility hook may fit tightly against the outer vertical surface and outer horizontal upper flange of the ceiling mounted section of the garage door track; and
said right angle extension further comprises a lip formed in a manner as to engage and hold the garage door utility hook onto the ceiling mounted garage door track.

14. The garage storage system of claim 13 wherein said lip is formed with an approximately 180 degree bend towards the lower portion of the garage door utility hook such that said lip may tightly encompass the horizontal upper flange's edge.

15. A system for storing an object in an elevated position from a standard overhead garage door track comprising:
a utility hook having an upper portion vertically continuous from the lower portion, wherein said upper portion is formed with approximately a right angle bend that is configured to extend over the ceiling mounted section of the garage door track, such that the upper portion of the utility hook is configured to fit tightly against the outer vertical surface and outer horizontal upper flange of the ceiling mounted section of the garage door track;
said right angle extension having a lip formed with an approximately 180 degree bend towards the lower portion of the garage door utility hook that is adapted to nonpermanently engage and hold the garage door utility hook onto the ceiling mounted section of the garage door track and as not to interfere with the garage door operation; and
said utility hook having a lower portion that is hook-shaped to engage and support said object, the hook supporting the object directly underneath the track.

16. The garage storage system of claim 15 wherein:
said lower portion is in the same plane as said upper portion and may singularly or plurally support said object; and
said lower portion's hook-shape opens toward the center of the garage door upon installation of said utility hook on the garage door track.

17. The garage storage system of claim 16 wherein said lip is formed with an approximately 180 degree bend towards the lower portion of the garage door utility hook such that said lip may tightly encompass the horizontal upper flange's edge.

18. The garage storage system of claim 15 wherein said lip is formed with an approximately 180 degree bend towards the lower portion of the garage door utility hook such that said lip may tightly encompass the horizontal upper flange's edge.

19. The garage storage system of claim 18, wherein:
said object to be supported is an elongated pipe or pole intended to be supported from under opposing garage door tracks;
said utility hook's lower portion being hook-shaped to engage and support the pipe's cross-section with a twist at the juncture of the lower and upper portions; and
said twist orientates the hook-shape approximately ninety degrees to the plane of the upper portion such that the supported pipe is in a plane perpendicular to the ceiling mounted section of the garage door track with the pipe supported on the installed garage door utility hook.

20. A system for storing an object in an elevated position from a standard overhead garage door track comprising:
an installed standard overhead garage door track;
an object to be stored from said garage door track;
a utility hook having an upper portion formed with approximately a right angle bend that may extend over the ceiling mounted section of the garage door track, such that the upper portion of the utility hook may fit tightly against the outer vertical surface and outer horizontal upper flange of the ceiling mounted section of the garage door track;
said right angle horizontal extension having a lip formed with an approximately 180 degree bend towards the lower portion of the garage door utility hook such that said lip may tightly encompass the horizontal upper flange's edge as to nonpermanently engage and hold the garage door utility hook onto the ceiling mounted section of said garage door track and as not to interfere with the garage door operation; and
said utility hook having a lower portion extending downward and orientated in the same plane as said upper portion, the lower portion having a first bend segment orientated away from the lip of the upper portion;
said lower portion's first bend segment extending downward to a second bend segment orientated back toward the lip of the upper portion; and
said lower portion's second bend segment horizontally extending under the upper portion with the lower portions second horizontal segment orientated approximately parallel to and under the upper portion's right angle extension to provide a flat supporting surface.

* * * * *